United States Patent [19]

Calman

[11] 4,027,249
[45] May 31, 1977

[54] VEHICLE RADIO CONTROL UNIT

[76] Inventor: Kenneth J. Calman, 1121 E. Commercial Blvd., Fort Lauderdale, Fla. 33334

[22] Filed: Dec. 19, 1975

[21] Appl. No.: 642,555

[52] U.S. Cl. .......................... 325/312; 179/1 VE; 325/16; 325/303; 325/311
[51] Int. Cl.² ........................................ H04B 1/16
[58] Field of Search ............. 325/16, 22, 303, 312, 325/15, 311; 179/1 SW, 1 VC, 1 VE, 1 VL, 2 B, 2 E

[56] References Cited

UNITED STATES PATENTS

| | | | |
|---|---|---|---|
| 3,277,374 | 10/1966 | Kobayashi | 325/303 |
| 3,493,681 | 2/1970 | Richards | 179/1 SW |
| 3,725,942 | 4/1973 | Ukmar | 343/715 |

Primary Examiner—Robert L. Griffin
Assistant Examiner—Marc L. Bookbinder

[57] ABSTRACT

This is a self-contained control unit for use in an automobile or other vehicle which has a citizens band radio receiver and an additional audio entertainment appliance, such as an AM radio, FM radio, AM/FM radio, or an audio magnetic tape player. The control unit includes an external speaker for the CB receiver, a plug for insertion in a jack on the CB receiver to connect the external speaker to it, a relay for controlling the operation of the additional audio entertainment appliance, and a transistor amplifier and switching circuit connected between the plug and the relay to disable the additional audio entertainment appliance whenever the CB receiver is broadcasting incoming CB signals through the external speaker. The switching circuit includes a time delay arrangement which delays turning on the additional audio entertainment appliance after the incoming CB signal has stopped.

8 Claims, 1 Drawing Figure

U.S. Patent May 31, 1977 4,027,249
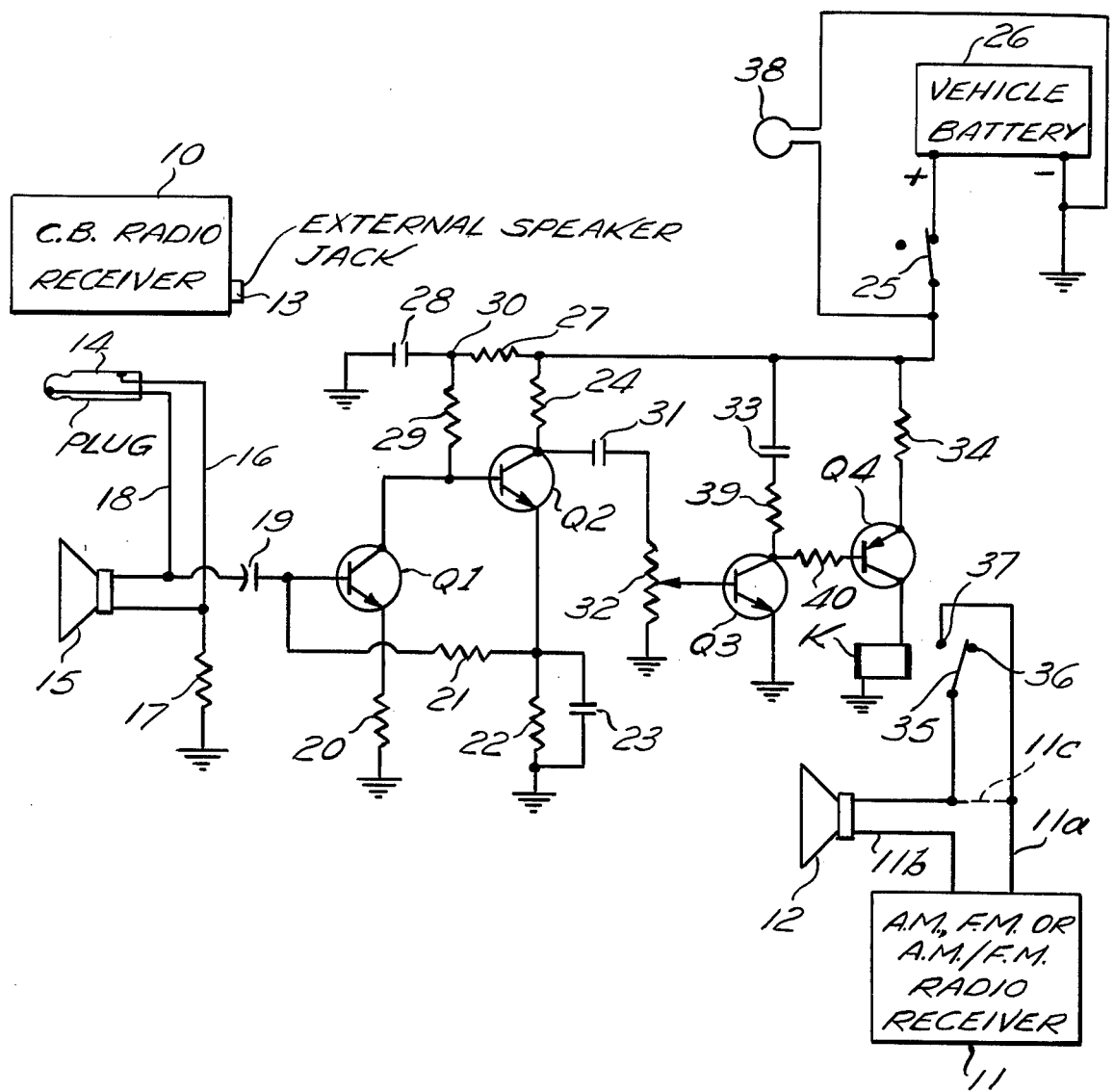

VEHICLE RADIO CONTROL UNIT

BACKGROUND OF THE INVENTION

Citizens band radio receivers have become increasingly popular for use in automoblies and trucks, sometimes to provide radio communication for volunteer firemen, or to enable radio communication between licensed citizens band broadcasters, and for various other purposes. Usually, the citizens band radio messages come in intermittently and irregularly, and many users prefer to listen to AM radio or FM radio broadcasts or to an audio tape player during the intervals when the CB radio receiver is silent.

It has been proposed heretofore to provide a combined CB radio receiver and AM or FM radio receiver for use in a car or truck with a switching arrangement for enabling the AM or FM receiver to play except when an incoming message is being received by the CB receiver. Such a combination assembly is relatively expensive and does not suit the needs of a user who simply wants to add on a CB receiver to an AM, FM or AM/FM receiver or a tape player already installed in the vehicle, or to provide an automatic switching interconnection between an existing CB receiver and an existing AM, FM or AM/FM receiver or tape player in the vehicle.

SUMMARY OF THE INVENTION

The present invention is directed to a control unit which may be readily connected to a CB radio receiver and an additional auto entertainment appliance (such as an AM, FM or AM/FM radio receiver or an audio tape player) in an automotive vehicle, such as a car or truck. This control unit gives priority to the CB receiver so that any incoming CB message is broadcast in the vehicle and the additional audio entertainment appliance is disabled automatically at that time. However, the additional audio entertainment appliance plays normally as long as no CB message is being received.

In the preferred embodiment this control unit includes:

1. an external speaker that is plugged into a jack in the CB receiver;
2. a transistor amplifier and switching circuit connected to the same plug as the external speaker for the CB receiver;
3. a relay operated by the switching circuit and connected to the vehicle battery for energization from the latter under the control of the switching circuit; and
4. connections from the relay to the additional audio entertainment appliance (radio receiver or tape player) in the vehicle to permit the latter to play as long as the relay remains energized.

When the CB receiver receives an incoming CB message, this is broadcast in the vehicle by the external speaker and the switching circuit de-energizes the relay to disable the additional audio entertainment appliance. When this CB message ends, the switching circuit energizes the relay to turn back on the additional audio entertainment appliance, preferably after an appropriate time delay following the end of the CB message.

A principal object of this invention is to provide a novel self-contained control unit for connection between a citizens band radio receiver and an additional audio entertainment appliance in a vehicle to permit the latter to play normally but to be automatically disabled when an incoming CB message is being received, so that the CB message will be broadcast in the vehicle, after which the additional audio entertainment appliance will be restored again to its normal operation.

Further objects and advantages of this invention will become apparent from the following detailed description of a presently-preferred embodiment thereof, which is shown schematically in the single FIGURE of the accompanying drawing.

Before explaining the disclosed embodiment of the invention in detail, it is to be understood that the invention is not limited in its application to the details of the particular arrangement shown since the invention is capable of other embodiments. Also, the terminology used herein is for the purpose of description and not of limitation.

Referring to the drawing, the control unit of the present invention is intended to be used in a vehicle, such as an automobile or truck, which may already be equipped with a citizens band radio receiver 10 and an additional audio appliance, such as an AM, FM or AM/FM radio receiver 11, having a loudspeaker 12. The present control unit enables the audio entertainment appliance 11 to play except when an incoming message is being received by the CB receiver. In that event, the audio entertainment appliance 11 is shut off automatically and the incoming CB message is broadcast inside the vehicle.

The CB receiver 10 is provided with the usual jack 13 for an external speaker. The present control unit has a telephone-type plug 14 of known design which may be removably inserted into the speaker jack 13. An external speaker 15 inside the vehicle is connected across the terminals of plug 14 for broadcasting incoming audio CB messages that are received by the CB receiver 10 when the plug is in the jack 13. The usual internal speaker in the CB receiver 10 is disconnected when plug 14 is inserted in jack 13.

One of the terminals of plug 14 is connected by its lead-in wire 16 to one end of a resistor 17, the opposite end of which is grounded. The other terminal of plug 14 is connected by its lead-in wire 18 to one side of a capacitor 19, the opposite terminal of which is connected to the first stage of a transistor amplifier.

The first-stage transistor Q1 in this amplifier is an NPN transistor having its base connected directly to capacitor 19, its emitter connected to ground through a resistor 20, and its collector connected directly to the base of the second-stage transistor Q2.

Q2 is an NPN transistor having its emitter connected to the base of Q1 through a resistor 21, and connected to ground through resistor 22 and capacitor 23 in parallel with each other. The collector of Q2 is connected through a resistor 24 and a manually operated switch 25 to the positive terminal of the usual battery 26 on the vehicle. A light emitting diode 38 is connected between switch 25 and ground to provide a visual indication that the battery 26 is connected in the circuit.

A resistor 27 and a capacitor 28 are connected in series with each other between switch 25 and ground. The collector of Q1 is connected through a resistor 29 to the juncture 30 between capacitor 28 and resistor 27.

Normally, with switch 25 closed and no incoming signal being received by the CB receiver 10, both Q1 and Q2 are biased off. An incoming CB signal applied to the plug 14 will be amplified by Q1 and Q2, as well as being broadcast inside the vehicle by the external speaker 15 for the CB receiver.

The amplified signal output from Q2 is applied through a capacitor 31 to the first stage of a transistor switching circuit. The first-stage switching transistor Q3 is an NPN transistor having its base connected to an adjustable tap on a potentiometer 32, the upper end of which is connected to capacitor 31 and the lower end of which is grounded. The emitter of Q3 is grounded. The collector of Q3 is connected through a capacitor 33 and resistor 39 to switch 25.

The second stage of the switching circuit has a PNP transistor Q4 whose base is connected to the collector of Q3 through a resistor 40. The emitter of Q4 is connected through a resistor 34 to switch 25. The collector of Q4 is connected to one end of a relay coil K, the opposite end of which is grounded.

Normally (i.e., in the absence of an incoming CB signal), Q3 is non-conducting and Q4 is conductive, so that relay coil K is energized from the battery 26.

Relay coil K controls the operation of relay contacts which include a mobile contact 35, an open-circuited fixed contact 36, and an opposite fixed contact 37. The additional audio entertainment appliance 11 has the usual pair of wires 11a and 11b leading to the speaker 12 for this entertainment appliance. In accordance with the present invention, one of these speaker wires 11a is cut or otherwise broken, as indicated schematically by the dashed line 11c. The mobile relay contact 35 is connected to wire 11a at the speaker side of this break and the fixed relay contact 37 is connected to wire 11a on the opposite side of this break.

Whenever the relay coil K is de-energized, the mobile relay contact 35 will engage the open-circuited fixed contact 36, thereby disabling the audio entertainment appliance 11 from operating its speaker 12. However, when relay coil K is energized, its contacts 35 and 37 engage, thereby connecting the audio appliance 11 to its speaker 12 to operate the latter in the usual way.

The reception of an incoming CB signal and its amplification at Q1 and Q2 will cause Q3 to be turned on, thereby turning off Q4 to de-energize the relay coil K. Accordingly, the audio appliance 11 will be disabled from broadcasting through its speaker 12 inside the vehicle whenever an incoming CB signal is received and is broadcast inside the vehicle by the external speaker 15 for the CB receiver. It will be apparent that the present control unit provides an audio operated switch that gives precedence to an incoming CB message by disabling the normally playing additional audio entertainment appliance 11 in the vehicle, which may be an audio tape player, an AM radio receiver, an FM radio receiver, or an AM/FM radio receiver.

After the incoming CB message ends, there is a time delay before the relay again connects the audio appliance 11 to its speaker 12. Preferably, this time delay is about 1 or 2 seconds. Its duration is determined by the inherent delay in the operation of the relay itself and by the values of capacitor 33 and resistor 34, which determine the time required for Q3 to turn off and Q4 to turn on following the termination of the CB message.

The sensitivity of the control unit's response to an incoming CB signal may be adjusted by changing the setting of the adjustable tap on potentiometer 32.

From the foregoing it will be evident that the present control unit may be readily added onto an existing CB receiver and an additional audio entertainment appliance, such as a radio receiver or a tape player in a vehicle. The operation is completely automatic, leaving the user free to enjoy the audio program he has selected but with the assurance that any incoming CB message will interrupt that program and be broadcast immediately without requiring any intervention on his part.

I claim:

1. A self-contained control unit for use on an automotive vehicle having
   a citizens band radio receiver,
   and an additional audio entertainment appliance,
   said control unit comprising:
   relay means for controlling the operation of said additional audio entertainment appliance;
   means for connecting said relay means to said additional audio entertainment appliance;
   audio-operated switch means operatively connected to said relay means for causing the latter to disable said additional audio entertainment appliance while said switch means is operated and to enable said additional audio entertainment appliance after said switch means is no longer operated;
   means for connecting said switch means to said citizens band radio receiver to be operated by incoming audio signals received by the latter; and
   time delay means operatively coupled to said switch means to delay the enabling of said additional audio entertainment appliance after the cessation of said incoming audio signals received by the citizens band radio receiver.

2. A control unit according to claim 1, and further comprising an external speaker for said citizens band radio receiver connected to said means for connecting said switch means to said citizen's band radio receiver to broadcast in the vehicle the incoming audio signals received by said citzens band radio receiver.

3. A plug-in control unit for use on an automotive vehicle having
   a vehicle battery,
   a citizens band radio receiver having an external speaker jack for receiving a plug,
   and an additional audio entertainment appliance,
   said plug-in control unit comprising:
   a relay having contacts for activating said additional audio entertainment appliance when the relay is energized and for disabling said additional audio entertainment appliance when the relay is de-energized;
   means for connecting said relay contacts to said additional audio entertainment appliance to control the latter's operation from the relay;
   switch means operatively connected to the relay to control the latter's energization;
   means for detachably connecting said switch means to the vehicle battery for energization of the relay from said battery;
   a plug for insertion into said jack on the citizens band radio receiver;
   an external speaker for said citizens band radio receiver operatively connected to said plug to receive the incoming audio signals received by the citizens band radio receiver and to broadcast those signals in the vehicle when said plug is in said jack; and
   amlifier means connected between said plug and said switch means to operate the latter for de-energizing said relay from said battery, whereby to disable said additional audio appliance, while said external speaker is receiving incoming audio signals from the citizens band radio receiver.

4. A plug-in control unit according to claim 3, and further comprising time delay means operatively connected to said switch means to delay the re-energization of the relay for a time interval following the cessation of incoming audio signals from the citizens band receiver at said external speaker.

5. A control unit according to claim 3, wherein said switch means comprises a pair of switching transistors connected in succession between the output of said amplifier means and said relay and interconnected to conduct alternately, one of said switching transistors being connected to the ouput of said amplifier means to be maintained non-conductive in the absence of an audio signal at said plug and to be turned on by said amplifier means when an audio signal is received at said plug, and the other of said switching transistors being connected between the vehicle battery and said relay to maintain the latter energized while said one switching transistor is off and to de-energize said relay when said one switching transistor is on.

6. A control unit according to claim 5, wherein said additional audio entertainment appliance has a speaker, and said relay contacts include a normally-open pair of contacts connected to said last-mentioned speaker to disable the latter as long as the relay is de-energized.

7. A control unit according to claim 6, and further comprising time delay means operatively connected to said switching transistors to delay the re-engerization of said relay after the end of an audio signal at said plug.

8. A control unit according to claim 7, wherein said amplifier means is a two-stage transistor amplifier.

* * * * *